June 13, 1961  T. K. L. FORS ET AL  2,988,338
PRESSURE-FLUID OPERATED VIBRATORS
Filed May 29, 1959  3 Sheets-Sheet 1

INVENTORS.
TORSTEN KARL LENNART FORS &
NILS ÅKE HELMER WIMMERSTEDT
BY
Brumbaugh, Free, Graves & Donohue
their ATTORNEYS.

INVENTORS
TORSTEN KARL LENNART FORS &
NILS ÅKE HELMER WIMMERSTEDT
BY

ATTORNEYS

June 13, 1961 T. K. L. FORS ET AL 2,988,338
PRESSURE-FLUID OPERATED VIBRATORS
Filed May 29, 1959 3 Sheets-Sheet 3

INVENTORS
TORSTEN KARL LENNART FORS &
NILS ÅKE HELMER WIMMERSTEDT
BY
ATTORNEYS

United States Patent Office 2,988,338
Patented June 13, 1961

2,988,338
PRESSURE-FLUID OPERATED VIBRATORS
Torsten Karl Lennart Fors, Vallinbby, and Nils Åke Helmer Wimmerstedt, Stockholm, Sweden, assignors to Aktiebolaget Vibro-Verken, Stockholm, Sweden, a corporation of Sweden
Filed May 29, 1959, Ser. No. 816,992
7 Claims. (Cl. 259—1)

The present invention generally relates to vibrators and more particularly to pressure-fluid operated vibrators.

This is a continuation-in-part of application Serial No. 685,915, filed September 24, 1957 now abandoned.

Several vibrators of the kind referred to have been proposed in the past. Such vibrators consist of, primarily, a gear pump connected to a source of fluid under pressure and operating as a motor, the pump having one or both of the intermeshing gears unbalanced by recesses or the like in the gears.

A disadvantage of such a construction, however, resides in the difficulty of producing a vibration amplitude which is sufficient for practical use. Therefore, in order to increase this amplitude, it has been proposed in the past to extend the shafts of the two intermeshing gears so as to make them project to the exterior of the vibrator casing and to affix additional eccentric weights to these projecting shaft portions. By this means, vibration amplitudes of the desired value are obtainable. However, due to the high fluid pressure involved, such a construction necessitates the additional provision of special sealing arrangements at the exits of the shaft or shafts from the casing which will add considerably to the complexity and cost of the construction.

Accordingly, one of the objects of the invention is to provide a vibrator device which will overcome the disadvantages mentioned above.

It is also an object of the invention to provide a new and improved vibrator device which will permit better control over the vibration amplitudes than is obtainable with vibrator devices heretofore known.

Generally, the invention is embodied in two mutually-intermeshing gears enclosed in a suitable casing. One gear is rigidly mounted in the casing, and the other gear is arranged to have a vibration-generating rolling motion imparted to it by a fluid flow passed through the casing.

Thus, by arranging the intermeshing gears in accordance with the present invention, it will be possible to employ a completely sealed rotary mounting for the shaft trunnions of the gears, and at the same time to satisfy the demand for greater amplitudes of vibration.

The invention will be described in more detail hereinafter in conjunction with the accompanying drawings, in which.

Figure 1:
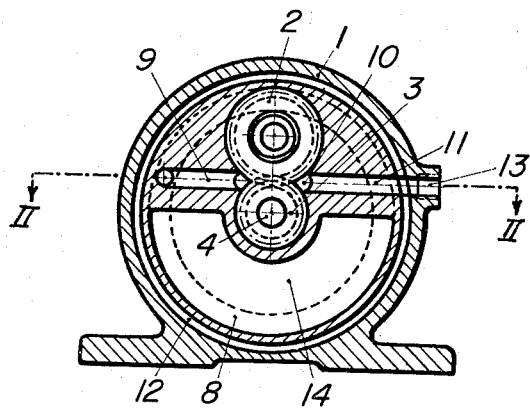
FIGURE 1 shows a section through the vibrator taken in a plane perpendicular to the gear shafts.

In FIGURE 1, numeral 1 designates the vibrator casing proper, in which casing two intermeshing toothed wheels or gears 2 and 3 are enclosed. The gear 3 is formed with axle trunnions 4 and is rigidly clamped in suitable bushings provided in the inner wall of the casing 1 so as to be immobile. The gear 2 meshing with gear 3 is rotatably mounted in a rotor body consisting of two parts 5 and 6, FIGURE 2, rigidly connected with each other and being, in turn, rotatably mounted on the axle trunnions 4 of gear 3. This rotor body, which has incorporated in itself a fluid passage system required for operating the vibrator and which will be described in greater detail presently, is unbalanced by a recess 14 or the like formed therein and is rotated by the gear 2 when, by a fluid under pressure admitted into the casing 1, this gear 2 is caused to roll about the periphery of the gear 3.

The rotor body 5, 6 is provided with an inlet passageway 9 which, through a circular groove 8 cut in the inner wall of the casing 1, receives a fluid under pressure from an inlet port 7 and conducts the same to the gears 2 and 3. The passageway 9 is enlarged at 10 to enable the fluid pressure to be distributed uniformly over the entire width of the gears 2 and 3.

After having passed the gears 2 and 3, the fluid enters a discharge passageway 11 which, through a groove 12 cut in the inner wall of the casing 1, communicates with an outlet port 13. Thus, through the grooves 8 and 12 in the casing 1, the inlet passageway 9 and the outlet passageway 11 are continuously in communication with the inlet port 7 and the outlet port 13, respectively, regardless of the fact that the position of the passageways 9 and 11 relative to the ports 7 and 13 will be continually changing due to the rotation of the rotor body 5, 6.

Figure 2:
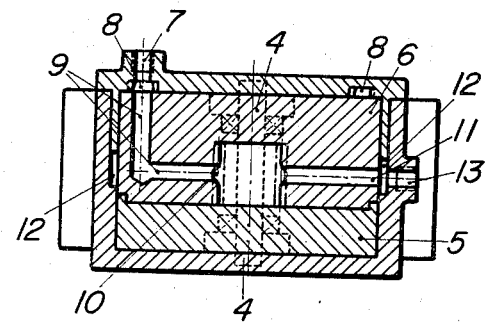
FIGURE 2 shows a section through the vibrator taken along the line II—II in FIGURE 1.
Figure 3:
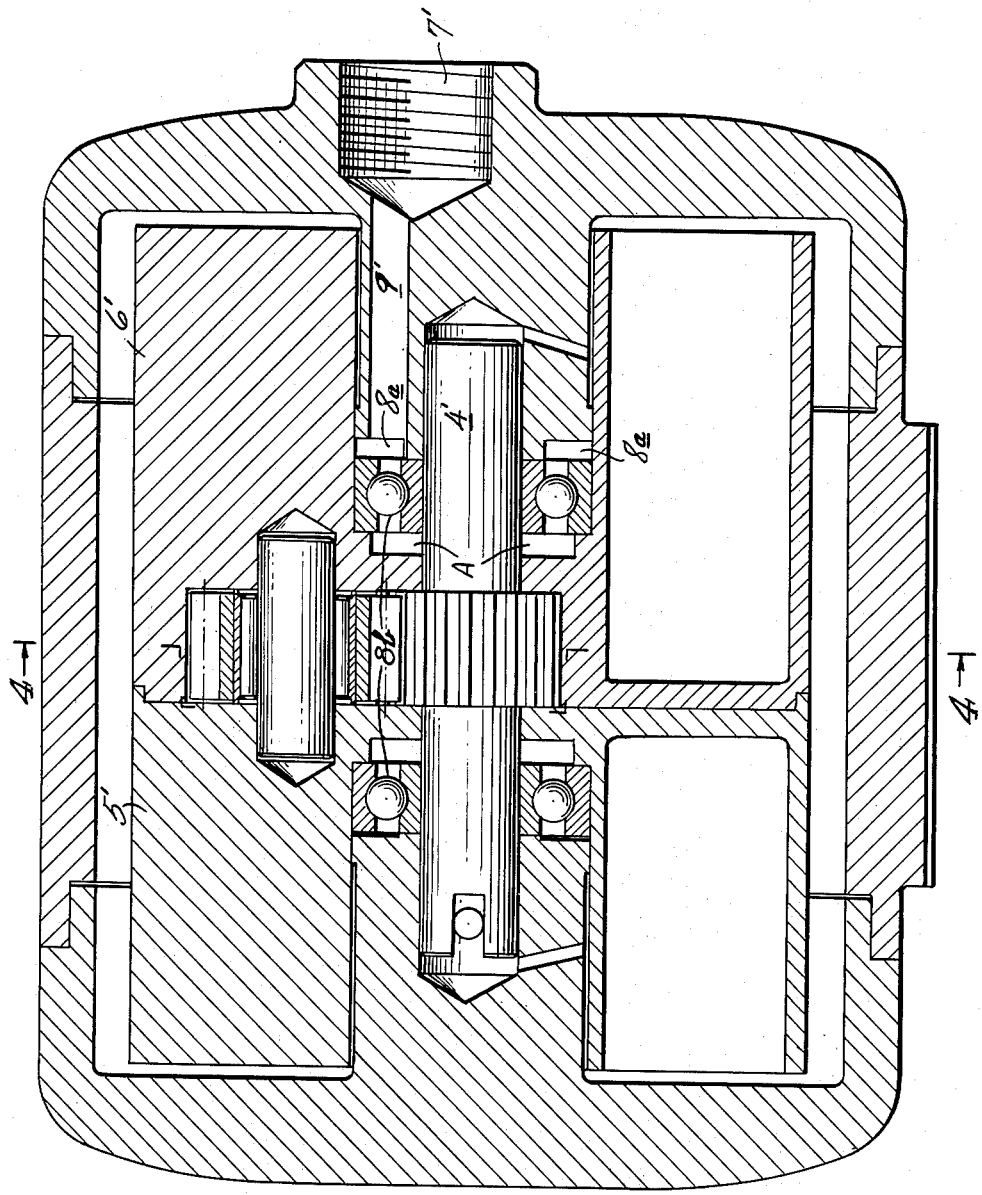
FIGURE 3 is a modification of the vibrator shown in FIGURES 1 and 2.
Figure 4:
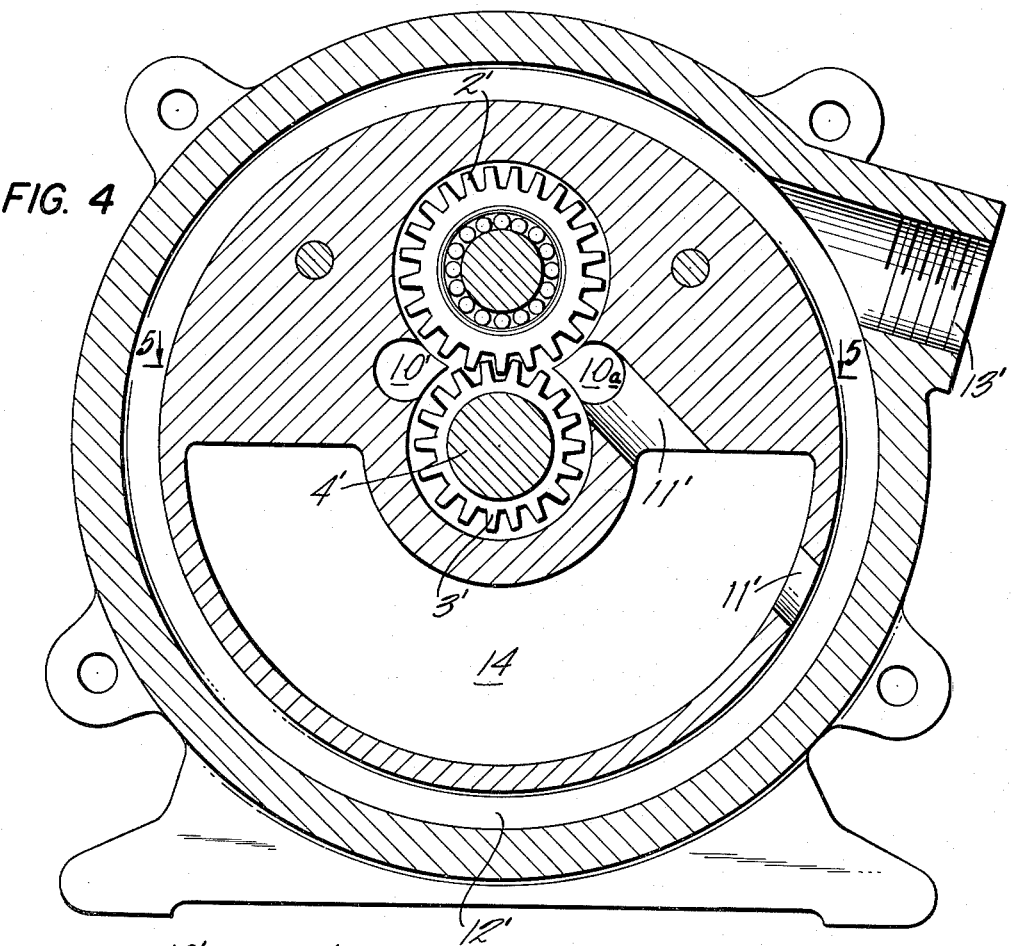
FIGURE 4 is a view taken along the line 4—4 in FIGURE 3.
Figure 5:
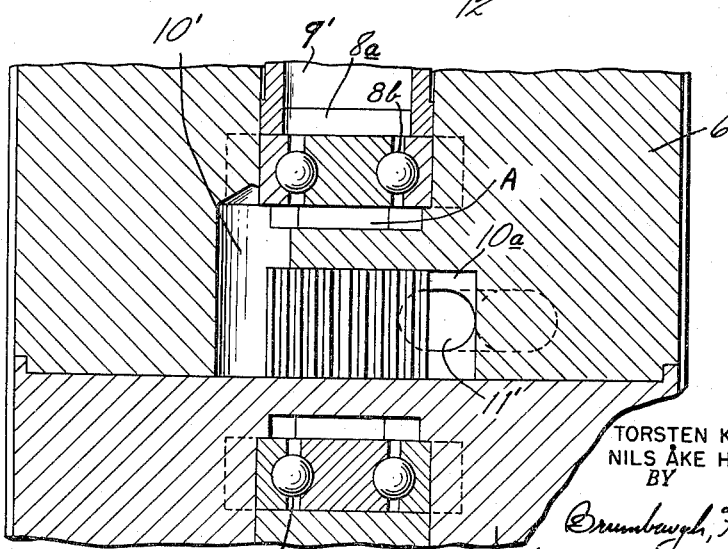
FIGURE 5 is a view taken along the line 5—5 in FIGURE 4.

A modification of the vibrator shown in FIGURES 1 and 2 is illustrated in FIGURES 3–5 and differs from the vibrator shown in FIGURES 1 and 2 only in the arrangement of the fluid passage system. Primed reference numerals have been used in the modification shown in FIGURES 3–5 to represent parts corresponding to similar parts shown in FIGURES 1 and 2. The principal difference between the arrangement shown in FIGURES 3–5 and that shown in FIGURES 1 and 2 is that the inlet port 7' is positioned just to one side of the axle trunnions 4', as seen in FIGURE 3. The passageway 9' now communicates between the inlet port 7' and a circular groove 8a adjacent one of two support bearings 8b for the rotor body 5', 6'. Thus, a fluid under pressure connected at the inlet port 7' passes along the passageway 9', around the circular groove 8a, and passes through the bearing 8b into a chamber A, FIGURE 3.

As best seen in FIGURES 4 and 5, the chamber A is in communication with the enlarged passage 10' to enable the fluid pressure to be distributed uniformly over the entire width of the gears 2' and 3'. Therefore, fluid pressure developed in the chamber A is communicated through the passage 10' to the gears 2' and 3'. After passing the gears 2' and 3', the fluid enters an exhaust chamber 10a which communicates with the groove or passage 12' between the casing wall and the rotor body by means of the discharge passageway 11'. The outlet port 13' communicates with the groove 12' as shown in FIGURE 4.

By arranging the fluid passage system as shown in the modification in FIGURES 3–5, the axial pressure on the rotor body 5', 6' by the fluid is reduced as compared with the arrangement shown in FIGURES 1 and 2. Thus, in the embodiment of FIGURES 1 and 2 the fluid in the circular groove 8 of the casing 1 forces the rotor body 5 and 6 axially against the other side of the casing. However, in the embodiment of the invention shown in FIGURES 3 to 5, the fluid acts only on surfaces having a radius equal to that of the groove 8a, which surface area is substantially less than the area provided by the groove 8 of FIGURES 1 and 2. It follows that the rotor body 5', 6' is subjected to less axial pressure than the rotor body 5, 6.

The hydraulic vibrator according to the present invention has been found to be highly advantageous in connection with the unloading of trucks or lorries having dumping bodies in which case it is connected directly to the hydraulic system with which such vehicles are, as a rule, equipped, but it is applicable for use also in connection with any other vibratile object where a continuous and accurate control of the vibration frequency is desired.

The configuration illustrated is regarded as the optimum, but some of the desirable results inherent in this disclosure may be obtained by various slight modifications including some departure from the exact configuration shown, and it is, therefore, understood that the scope of the invention should be regarded as limited only by the terms of the claims.

We claim:

1. A fluid-operated vibrator device comprising two intermeshing toothed gear members, a casing means to enclose said gear members, a first of said two gear members being fixedly mounted within said casing means, an unbalanced body member supported within said casing means to rotate about said first gear member, a second of said two gear members rotatably supported by said unbalanced body member for rotation with said body member about said first gear member to generate vibrations, and means to direct a fluid flow through said casing means to impart a rotary motion to said second gear member.

2. The fluid-operated vibrator device of claim 1 in which said fluid directing means comprises a system of passageways to operably communicate a fluid under pressure with said gear members.

3. The fluid-operated vibrator device of claim 1 in which said fluid flow directing means comprises a first substantially circular passageway in said casing means, a fluid inlet means communicating a fluid under pressure with said first passageway, a second substantially circular passageway in said casing means, and a fluid outlet means communicating with said second passageway for removing said fluid.

4. A fluid-operated vibrator device comprising two intermeshing toothed gear members, a substantially circular body member to enclose said gear members and in which said gear members are supported, a casing means to enclose and support said body member and gear members, a first of said two gear members being rigidly mounted in concentrically spaced relation to said casing means, said body member enclosed within said casing means being mounted to be rotatable about the axis of said first gear member, said body member being unbalanced with respect to its axis of rotation, a second of said two gear members being rotatably supported by said body member such that any rotation of said second gear member will cause rotation of said body member, and a system of passageways to operably communicate a fluid under pressure with said gear members.

5. The fluid-operated vibrator device of claim 4 in which said system of passageways comprises an inlet port, an inlet passageway communicating between said inlet port and said two intermeshing gear members, an outlet port, and a discharge passageway communicataing between said two intermeshing gear members and said outlet port.

6. The fluid-operated vibrator device of claim 5 in which said inlet port is removed substantially from the axial position of said first gear member, a first circular groove formed in said casing means and in communication with said inlet port, said outlet port being positioned so that its axis is substantially perpendicular to the axis of said first gear member, a second circular groove formed in said casing means and in communication with said outlet port, said inlet and outlet passageways being formed in said body member to communicate between said first circular groove and said gear members and between said gear members and said second circular groove, respectively.

7. A fluid-operated vibrator device comprising two intermeshing toothed gear members, a casing means to enclose said gear members, a first of said two gear members being fixedly mounted within said casing means, bearing means on each side of said first gear member, an unbalanced body member supported by said bearing means to rotate about said first gear member, a second of said two gear members rotatably supported by said unbalanced body member for rotation with said body member about said first gear member to generate a vibration, an inlet port in said casing means in substantial axial alignment with said bearing means, an inlet passageway communicating between said inlet port through one of said bearing means to said gear members to direct a fluid flow through said casing means to impart a rotary motion to said second gear member, an outlet port in said casing means having an axis substantially perpendicular to the axis of said inlet port, and a discharge passageway communicating between said gear members and said outlet port.

References Cited in the file of this patent

UNITED STATES PATENTS

| | | |
|---|---|---|
| 2,198,148 | Bailey | Apr. 23, 1940 |
| 2,204,472 | Caquot | June 11, 1940 |
| 2,645,903 | Elkins | July 21, 1953 |